June 19, 1962
C. H. HALL ET AL
3,039,138
METHOD AND APPARATUS FOR HANDLING DEFORMABLE
PLASTIC-LIKE MATERIALS
Filed March 31, 1959
4 Sheets-Sheet 1
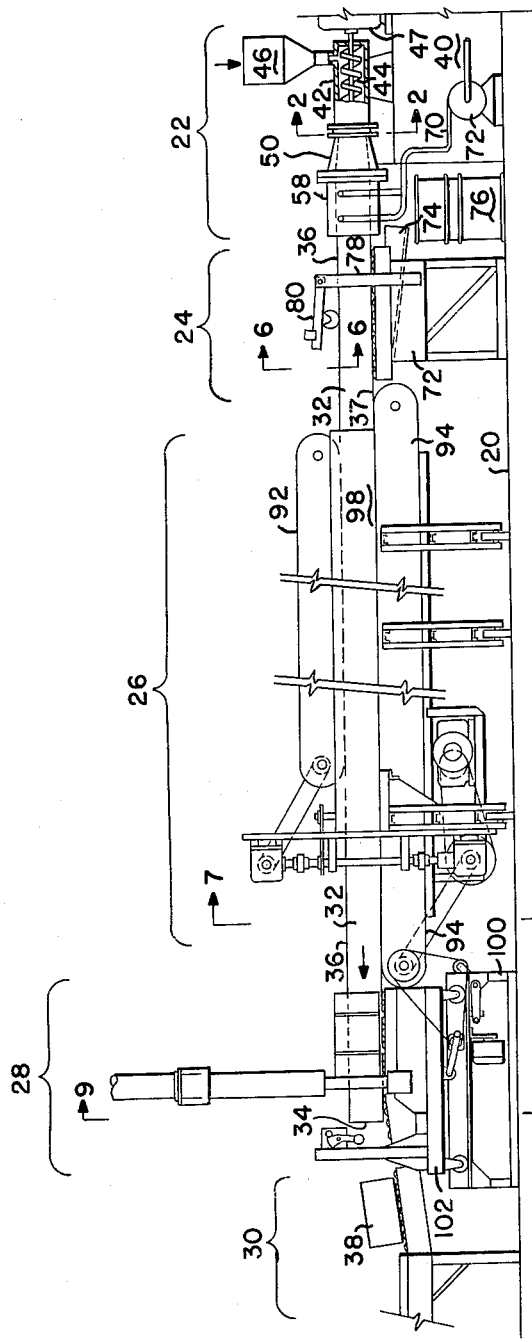
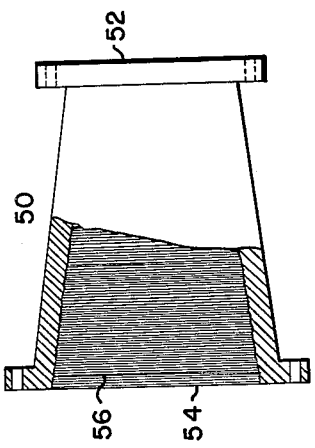
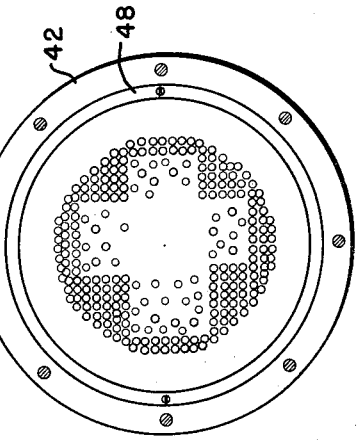
Christopher Hammond Hall
William Deranzil Hanvill    Inventors
Charles Leo Conley, Jr.
By H. A. Pattison Jr.    Attorney Christopher Hammond Hall
William Deranzil Hanvill   Inventors
Charles Leo Conley, Jr.

By H. A. Pattison Jr   Attorney

June 19, 1962 C. H. HALL ET AL 3,039,138
METHOD AND APPARATUS FOR HANDLING DEFORMABLE
PLASTIC-LIKE MATERIALS
Filed March 31, 1959 4 Sheets-Sheet 3

Christopher Hammond Hall
William Deranzil Hanvill   Inventors
Charles Leo Conley, Jr.

By H. A. Pattison Jr.   Attorney

Christopher Hammond Hall
William Deranzil Hanvill     Inventors
Charles Leo Conley, Jr.

By *H. A. Pattison Jr*   Attorney 3,039,138
METHOD AND APPARATUS FOR HANDLING DEFORMABLE PLASTIC-LIKE MATERIALS
Christopher Hammond Hall, Baton Rouge, La., and William Deranzil Hanvill and Charles Leo Conley, Jr., Cuyahoga Falls, Ohio, assignors to Esso Research and Engineering Company, a corporation of Delaware
Filed Mar. 31, 1959, Ser. No. 803,296
7 Claims. (Cl. 18—4)

This invention relates to apparatus and methods for extruding, forming, and simultaneously reforming and finishing plastic-like deformable materials, and has particular reference to a process and apparatus whereby the slug-extrusion of soft, granular, plastic, rubber-like materials may be controlled in such a way as to obtain extruded products having the form of large solid blocks of predetermined density, predetermined size and predetermined surface finish. It is applicable in general to all types of plastic-like or rubber-like deformable materials and with particular advantage, as more fully described hereinafter, to such deformable materials as butyl rubber, halogenated butyl rubber, polyisoolefins such as polyisobutylene, ethylene-propylene copolymers, polymers prepared in the presence of metal alkyl type catalysts, polyethylene, polypropylene, halogenated polyethylene, halogenated copolymers of ethylene and alpha olefins, rubbery butadiene-styrene copolymers, rubbery butadiene acrylonitrile copolymers, synthetic polyisoprene, natural rubber and many other saturated or unsaturated synthetic plastic or rubber-like deformable materials.

The extrusion of plastic or rubber-like materials for packaging is widely practiced as an economic method of molding predetermined shapes of extruded products. However, difficulty has been encountered during the extrusion and finishing steps in that the extrudate formed, upon expansion from the extruder die, often contains voids, is non-homogeneous and porous, is of uneven density and the surfaces of the shaped extrudate are often rough in nature resulting in an unsightly appearance. A similar problem results in that the conventional extrusion is from a circular die by means of a spiral or helical compressing means such as a worm which results in a cylindrical shaped extrudate. In the rubber and plastics industries it is also desirable to store and ship square or rectangular shaped packages of extruded material formed.

Finally, it has been observed that by any known process of the prior art the finished extrudate tends to swell or "bloom" causing difficulty in packaging and if a conveying means is used permitting contact of the rubber or plastic mass with a cooling medium such as air, the surfaces of the rubber or plastic material become additionally roughened. In this regard there often is also some difficulty in obtaining a completely square or rectangular shaped block of rubber or plastic-like material for packaging since any conventional cutting means necessarily cuts the material as it is traveling either through the end of the extruder or through a conveying means at a remote distance from the extruder which results in cutting the rubber or plastic at an angle rather than perpendicular to the surfaces being confined in the cutter.

In accordance wtih the present invention, all of the above-mentioned disadvantages are overcome and a new and useful process and apparatus for finishing plastic rubber-like materials is provided resulting in void-free, even density, smooth, non-buckling products as more fully set forth hereinafter. More particularly, the rubber-like material, advantageously while warm, is forced through a plurality of passageways defined in a preferably circular die plate closure by a compressing means such as a screw conveyor and introduced to a preferably lubricant-free interiorly roughened expansion chamber having a circular inlet end adapted for attachment to the circular die plate. The wall portions of this expansion chamber are tapered or flared outwardly to an outlet of rectangular or square cross section of larger dimension than said inlet. The larger cross section of the expansion chamber permits expansion of the extruded rubber-like material and the relief therein of built-up stresses due to extrusion. The fact that the interior surfaces of the wall portions are roughened or corrugated provides a drag on the extrudate offering sufficient resistance to the flow of the material thereby to build up a pressure head resulting in compressing the material into a solid, dense, non-porous mass.

The compacted extrudate thus produced is then introduced into a forming chamber of somewhat roughened interior of rectangular or square cross section, this being the same cross section as the outlet of the tapered expansion chamber. This forming chamber is lubricated interiorly, say with a soap solution, advantageously through a series of apertures in the sides of the chamber. The forming chamber is of sufficient length to form the polymeric material into the desired shape of rectangular or square cross section from which blocks of desired length may be cut. The fact that the interior chamber walls are roughened and retain lubricant causes the outer surfaces of the extrudate to become glossy in finish and attractive in appearance.

After the extrudate passes through the uniform cross section, lubricated forming chamber it is in continuous billet form, and at least one of its longitudinal surfaces is borne upon by the sensing element of a speed measuring device. This device generates a signal of magnitude corresponding to the rate of forwarding of the extrudate billet, and transmits this signal to regulator means controlling the driving means for a set of reforming and finishing belts more fully described hereinafter. This driving means is so controlled by the regulator means that the surface speed of each of these belts is made essentially equal to the lineal speed of exrudate leaving the forming chamber.

The reforming and finishing belts above mentioned, preferably comprising slat conveyors, define an enclosure of extended length, essentially axially aligned with the forming chamber, and having a rectangular or square internal cross section substantially identical with that of the forming chamber. The internal surfaces of the belt enclosure are, by reason of the speed sensing means, regulator means, and driving means mentioned already, moving at the lineal speed of the extrudate billet, and are further moving in the same direction as this billet.

Following its passage by the sensing element of the speed measuring device, the extrudate enters the enclosure of reforming and finishing belts just described. These belts bear against all longitudinal surfaces of the extruded mass to reform this mass to essentially the same cross sectional shape and size that it had at the outlet of the forming chamber, considering that this mass or extrudate billet may have bloomed or expanded laterally a slight amount after leaving the forming chamber.

The reforming and finishing belts, which as a group may be referred to generally as a conveyor or conveyor means, preferably comprise slat conveyors, desirably ones constructed of stainless steel, although any other suitable configuration and materials of construction may be used. More specifically, the conveyor belts preferably constitute a four-sided slat conveyor each belt being made up of a plurality of closely interconnected panels which may allow cooling of the rubber-like stock by conduction during its passage therethrough. Because the internal surfaces of the conveyor means move at the rate of extrusion and in the direction of extrusion, (i.e., at the same rate as the discharge of rubbery material from said forming chamber) the surfaces and shape of the extrudate formed in the rectangular or square, lubricated uniform cross sectional dimension forming chamber are maintained smooth or finished. The conveyor means is of sufficient length to allow the polymer to assume permanently stable form and shape therein. With this arrangement, expansion or blooming does not occur once the material leaves the outlet portion of the conveyor means. The foregoing described functions of the conveyor means, namely to reform and maintain surface finish of the extrudates and especially to reform it, are critical for purposes of this invention.

After the rubber-like material passes through the conveyor means of rectangular cross section, it passes to an apparatus or means for dividing this rubber-like material into substantially uniform shaped blocks suitable for packaging. This last-mentioned dividing apparatus is advantageously a flying shear comprising a platform support, a carriage mounted on this support for limited reciprocating movement therealong in line with the axis of the conveyor and reforming means, and driving means for this carriage whereby such reciprocating movement is imparted thereto, this driving means being in turn powered through the driving means for the slat conveyor belts. The carriage driving means preferably includes an electrically actuated clutch and brake arrangement adapted to synchronize the starting and stopping of carriage movement with other events taking place in the regular course of operation of the presently disclosed apparatus embodiment of this invention.

The flying shear or extrudate block cutoff apparatus also comprises a mechanically, electrically, pneumatically, or especially hydraulically-operated knife element supported above the carriage intermediate the ends thereof and transversely to the conveyor and carriage axis, and adapted to perform controlled downward cutting strokes as the extrudate billet longitudinal motion continues uninterruptedly so as to make a square cut on the billet, each followed by an upward retracting stroke, and in this way divide the rubber-like material into the blocks hereinbefore mentioned. The extrudate block cutoff apparatus further comprises a switch mechanism, preferably electrical, mounted on the carriage beyond knife element in the direction of movement of the material, this switch mechanism being disposed to be tripped by the extrudate material itself to energize electric circuits and trip further circuit switches to drive the carriage periodically along its platform support in the direction of movement of the rubber-like material; cause the knife element to descend and squarely cut off a block of this material as the billet motion continues, and thereafter retract to its raised position all the while traveling with the carriage on the outward stroke of the reciprocating movement thereof, and finally retract the carriage itself to its position closest adjacent the conveyor and finishing means. In the foregoing operations subsequent to the tripping of the electrical switch mechanism and cyclic repetitions thereof, the solid extruded material is cut off in blocks of the desired length without interfering with the continuous flow of material.

The nature and substance of this invention may be more clearly perceived and fully understood by referring to the following description and claims taken in connection with the accompanying drawings of a preferred apparatus embodiment in which:

FIG. 1 represents a side elevation view of a preferred machine for compressing and extruding a plastic, rubber-like, and initially granular or crumbly material, and forming the same into a solid, continuously generated billet which is reformed and finished and then cut into rectangular blocks according to this invention;

FIG. 2 represents an enlarged view in transverse sectional elevation through the machine of FIG. 1 on the plane of line 2—2 therein, particularly showing the die plate wherethrough plastic, rubber-like material fed to this machine is extruded, but omitting any showing of the extruded plastic material;

FIG. 3 represents an enlarged view in side elevation, partly broken away, of the expansion chamber directly following the die plate of FIG. 2, particularly showing the roughened interior surface of this chamber, but omitting any showing of the extruded plastic material expanded therein;

Figure 6:
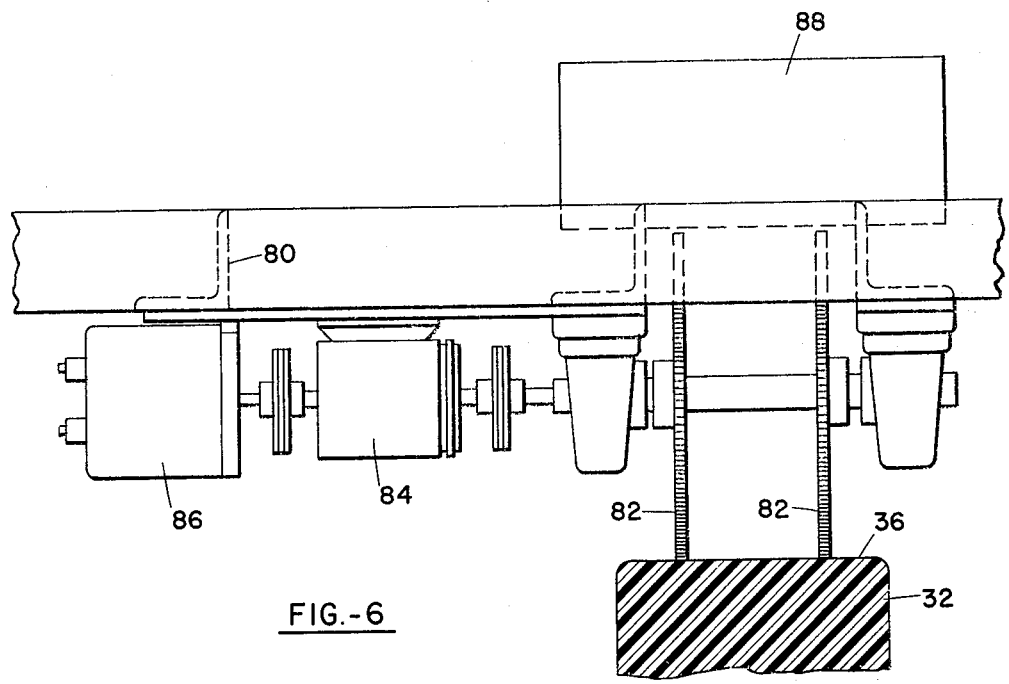
Figure 7:
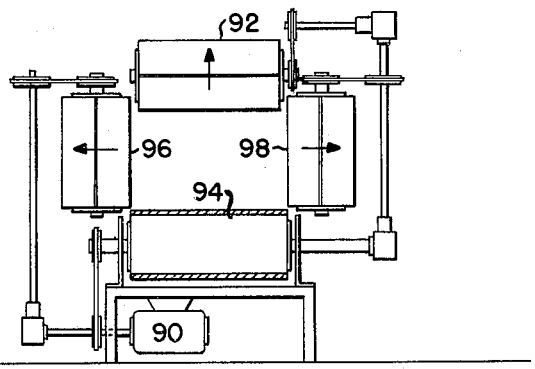
Figure 9:
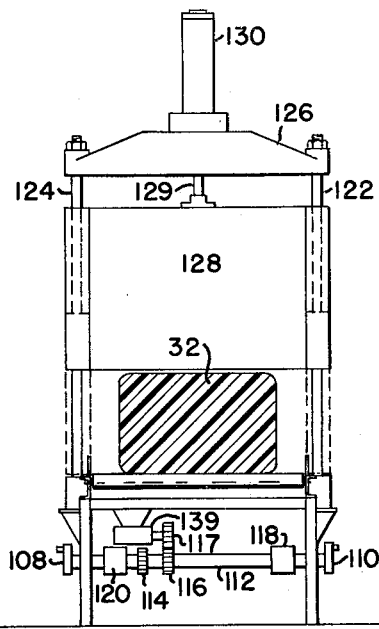
Figure 8:
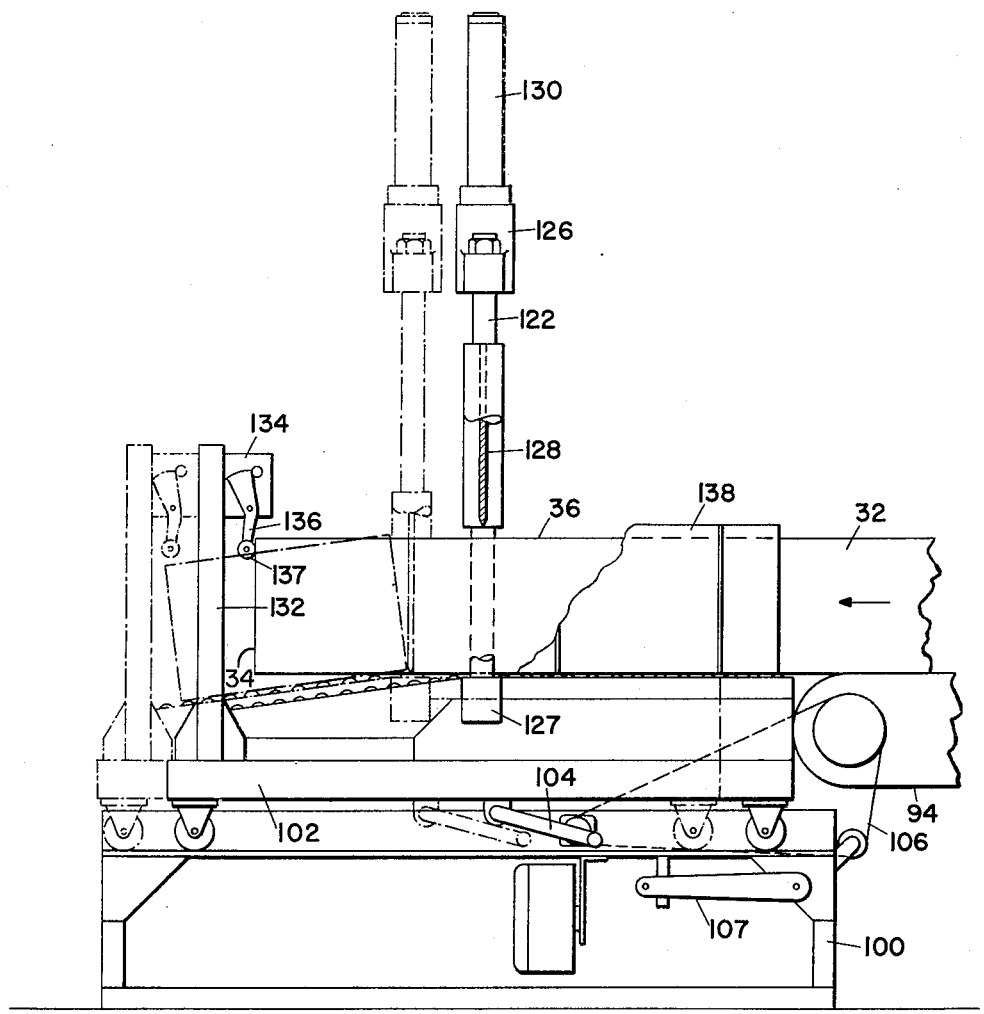

FIG. 6 represents an enlarged view in transverse sectional elevation through the machine of FIG. 1 on the plane of line 6—6 therein, particularly showing apparatus for sensing lineal speed of the formed plastic material, this apparatus including knurled wheels in driven contact with the upper surface of the formed plastic material, and an induction generator driven by these wheels through an intermediate speed changer;

FIG. 7 represents an enlarged view in transverse sectional elevation through the machine of FIG. 1 on the plane of line 7—7 therein, particularly showing the upper, side, and bottom slat conveyors defining a rectangular passage wherein the formed plastic material is reformed and finished, and also showing the motor and transmission means for driving these conveyors, but omitting any showing of the formed plastic material reformed and finished in the passage defined by the slat conveyors;

FIG. 8 represents an enlarged view in side elevation, partly broken away, of the shearing apparatus of the machine of FIG. 1 whereby the formed plastic material is cut off into blocks of predetermined length, particularly showing the knife element of this apparatus in both its top and bottom positions, and FIG. 9 represents an enlarged view in transverse sectional elevation through the machine of FIG. 1 on the plane of line 9—9 therein, particularly showing the knife element of the shearing apparatus of FIG. 8 on its descending stroke about to make contact with the finished plastic material.

Referring now to the drawings, particularly FIG. 1 thereof, 20 designates a relatively level surface such as a factory floor whereon or wherefrom the illustrated apparatus is supported. This apparatus is divided into five major operating sections as follows: a feed material extruding and extrudate billet forming section 22, a die takeaway and extrudate billet speed sensing section 24, an extrudate billet reforming and finishing section 26, an extrudate block cutoff section 28, and an extrudate block takeaway section 30. These several operating sections will be described individually, and the nature of their actions cooperative one with another to form a unified mechanism explained clearly.

Before proceeding with such description and explanation, however, it is desired to distinguish between machinery items on the one hand and product items formed by these machinery items on the other. In FIG. 1, a billet of extruded material or extrudate billet 32 having a rectangular cross section is shown extending from the feed material extruding and extrudate billet forming section 22 over and through the sequentially following operating sections 24 and 26, and onto and part way through the extrudate block cutoff section 28. Billet 32 is shown as having a forward surface 34, a top surface 36, and a bottom surface 37. Supported on the final operating section, section 30, is a block 38 of extrudate material which has been cut off previously from billet 32. This extrudate block represents the final product output of the several operating sections of the illustrated apparatus.

Considering now the feed material extruding and extrudate billet forming section 22 as this operating section and component parts thereof are shown in FIGS. 1, 2, 3, 4, and 5, a foundation block 40 extending above level surface 20 has mounted upon it an extruding machine including a cylindrical tube 42 shown partly broken away, a screw 44 within this cylinder, and a hopper 46 wherethrough granular particles of rubber-like materials of the kinds described already may be introduced. Screw 44 is provided with a shaft which extends rightwardly through an end closure plate or head of cylinder 42. The screw shaft is joined with the shaft of an electric motor 47 whereby the screw is driven.

At its left end, cylinder 42 is provided with an outwardly extending flange, and is closed by a die plate 48 shown in some detail in FIG. 2. This die plate is characterized by a multiplicity of extrusion holes each having a diameter of about ⅜", for example. These holes are disposed in a circular pattern having an outside diameter substantially the same as the bore of cylinder 42. Die plate 48 may be located transversely on the flange of cylinder 42 in a shallow counter bore in this flange. Likewise, it may be lightly retained thereon by fastener means such as screws.

To the left of die plate 48 is expansion chamber 50 shown in some detail in FIG. 3. This chamber is flanged at both left and right ends. At its right and smaller end, it is circular in both internal and external cross section. Its bore at this end is substantially equal to that of cylinder 42. A bolted connection at their matching flanges is made between cylinder 42 and expansion chamber 50, these flanges being held apart, however, by the interposed die plate 48. Substantial bolting force is employed so that the die will be held very firmly against the left end of cylinder 42. At its own left and larger end 54, expansion chamber 50 is circular in external but rectangular in internal cross section. Its internal cross section area at this end is larger than that at its right end 52. Substantially the entire interior wall surface 56 of the expansion chamber is characterized by a significant degree of roughness, such as that produced by sandblasting, so that it provides a drag on the billet passing therethrough to assist in adhering together the individual extruded strands into a continuously moving, uniform, dense, void free, substantially homogeneous mass.

Figure 4:
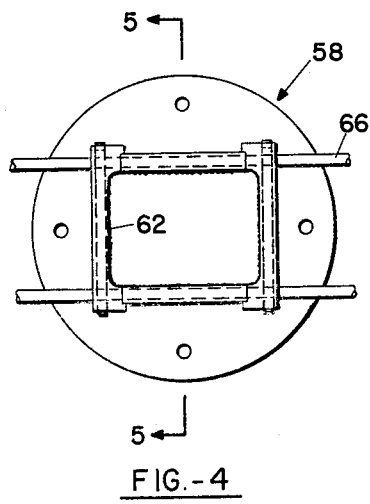
FIG. 4 represents an enlarged view in left end elevation of the forming chamber directly following the expansion chamber of FIG. 3, particularly showing the substantially rectangular outlet opening of this forming chamber, but omitting any showing of the expanded plastic material formed therein.
Figure 5:
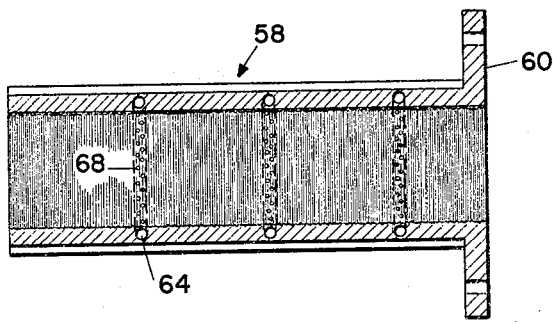
FIG. 5 represents a view in longitudinal sectional elevation through the forming chamber of FIG. 4 taken on the plane of line 5—5 therein, particularly showing the peripheral passages through the walls of this chamber and outlet openings therefrom wherethrough lubricating fluid may be supplied to the main chamber region in which the expanded plastic material is formed.

To the left of expansion chamber 50 is chamber 58 shown in some detail in FIGS. 4 and 5. In terms of its function, which will be described presently, this chamber may be considered a forming chamber for the product material. At its right end 60 it is provided with a circular flange adapted to be made up in bolted connection with the flange at the left end 54 of expansion chamber 50. The main longitudinal internal passage through forming chamber 58 is of uniform rectangular cross section, and is of essentially the same size and shape as the passage through the expansion chamber as this passage is defined at the left or outlet end of chamber 50. The forming chamber passage is thus a direct continuation of the expansion chamber passage. There is considerable similarity between the interior surfaces of the expansion chamber and those of the forming chamber. More particularly, all interior wall surfaces 62 of the latter forming chamber 58 are somewhat roughened as by sandblasting to assist in distributing lubricant over the forming chamber surfaces as by capillary action, and particularly to assist in retaining lubricant on these surfaces against wiping action of the extrudate as it passes therethrough.

The wall members which define the main passage through forming chamber 58 are themselves, in a preferred embodiment, provided with internal, peripheral passages such as 64 to which external connections may be made by pipes such as 66. The passages 64 each have a plurality of small openings 68 extending laterally therefrom into the main axial passage through forming chamber 58 while the pipes 66 are joined in a common line 70 (ref. FIG. 1) coming from the discharge connection of pump 72 which is adapted to handle fluid lubricants.

Considering next the operation of the feed material extruding and extrudate billet forming section 22, assume that motor 47 is running to cause rotation of screw 44 within cylinder 42. Deformable material to be operated upon by the apparatus of this invention is fed into hopper 46 in chunk form and falls into the screw. The screw drives this material positively to the left against die plate 48, building up a substantial pressure on the material. If the pressure is of sufficient magnitude, the material is elevated in temperature, for example, into the range of about 20° to 200° C.

The compressed and warmed material, now cohered rather than granular, is extruded through the apertures or holes in die plate 48 as a plurality of strands which enter expansion chamber 50. The material which these strands comprise will have very substantial built-up internal stresses, and will thus expand considerably within chamber 50, the strands themselves coming together. The whole mass will, of course, be tending to move to the left as fresh extrudate comes through the die. That material in contact with the roughened wall surfaces 56 will, however, have a drag imposed upon it, and will tend to slow down leftward progress of the whole extrudate body. This body will, therefore, be compacted. Likewise it will change in cross section from round to rectangular between ends 52 and 54 of chamber 50. Upon its arrival at the right end 60 of forming chamber 58, the material will have achieved substantially its final density and transverse form.

Passing into forming chamber 58, the extruded material, now taking on the configuration of a rectangular or square billet, will run upon lubricated walls 62 which will tend to give the billet surface a well finished and polished appearance. This effect will be aided by having a lubricating material supplied to the forming chamber by pump 72 through pipes 70 and 66, internal passages 64, and wall perforations or openings 68. The lubricant employed might be, for example, an aqueous solution of a soap or detergent.

It will, of course, take any given section of the billet a definite period of time, which may be considered a dwell, to pass through forming chamber 58. While the material is in this chamber, many remaining internal stresses it has will have an opportunity to relieve themselves by extending the billet longitudinally. This is not objectionable so long as the transverse shape of the billet is maintained as it is by the rigid walls of the forming chamber 58. In particular language, much of the tendency of the material to bloom has been relieved by the time the material reaches the outlet end of forming chamber 58.

Considering next the structure and operation of the die takeaway and extrudate billet forming speed sensing section 24 as this is shown in FIGS. 1 and 6, a roller table support 72 is provided over which the extrudate billet 32 rides on its lower surface 37. This table, as an incidental matter is preferably equipped with a drip pan 74 for lubricant running off the billet, this pan being so pitched to drain this liquid back to a drum or receiver 76. Set on and over table 72 is a frame structure 78 through which the extrudate billet passes. This frame has an additional frame structure 80 pivoted to it along its upper edge.

Frame 80 carries a pair of knurled edge wheels such as wheels 82 which are adapted to run on the upper surface 36 of billet 32 and be driven by it. Other elements carried by frame 80 on its underside are a speed changer 84 and an induction generator 86 connected to each other and to wheels 82 through appropriate shafting as shown. The nature of speed changer 84 is such that angular motion of wheels 82 will be multiplied, 30 times for example, depending on the nature of the deformable material, at generator 86. On the upper side of frame 80 there is preferably also a counterweight 88 intended to maintain sufficient pressure of wheels 82 on billet upper surface 36 that the billet will impart a no-slip drive to the wheels, and hence, eventually, to generator 86. This counterweight may be varied to give different pressures of wheels 82 on billet surface 36 depending on variations in coefficients of friction between the wheels and the many extruded materials which the billet may comprise. As a caution, wheels 82 should not be weighted to the point that they dig deeply into and permanently mar the billet top surface 36.

Generator 86 provides as its output a voltage signal having a magnitude which corresponds to the lineal speed of billet 32, whatever this speed may be. This voltage is transmitted in a conventional external circuit, not shown, to a comparator means in which it is matched against a voltage similarly generated which in turn corresponds to the lineal speed of certain slat conveyor elements to be more fully discussed in the course of description of the extrudate billet reforming and finishing section 26.

The comparator means provides as its own output a voltage which represents the difference between the two voltages representing the speeds already described. This difference or error voltage, amplified as necessary, is employed in a suitable electro-mechanical system not shown but of a kind well known in the art to regulate the speed of motor 90 (shown in FIG. 7) which is the driving motor for the aforementioned slat conveyor elements of operating section 26, and also for the carriage of the extrudate block cutoff section 28, as more fully described hereinafter. The nature of the regulation imposed on motor 90 is such to make the lineal speed of the slat conveyors essentially equal to that of top surface 36 of billet 32; that is, to wipe out the error voltage. It may be seen, accordingly, that by means of the billet speed sensing apparatus shown and otherwise disclosed, operating features of the apparatus of this invention which are located "downstream" are controlled by the rate of extrudate billet forwarding or generation, however, this rate may vary due to feeding of material into hopper 46, speeding up or slowing down of extruder screw motor 47, or any other reason.

While the function of the regulator circuitry and apparatus associated with the billet speed sensing means of FIG. 6 has been described clearly, some further comment on its structure may be in order. Suppose that belt drive motor 90 is a direct current motor. Control of its speed may be achieved easily by varying its field current. This variation may be achieved in turn by a rheostat located in the motor's field supply circuit, this rheostat having a slider which is connected mechanically to the output shaft of another motor which will be energized upon receiving an amplified error signal. Suppose, for another example, that the belt drive motor 90 is an alternating current motor. Such motors are most frequently employed to run at constant speed. Such a motor may, however, be equipped for effective speed variation purposes with a "Reeves" pulley on its output shaft.

This pulley, used advantageously with V-belt drives, comprises two separate discs which are shaft-connected and which taper inwardly to become of greater thickness at their centers than at their peripheries. The shaft mounting of these discs allows the distance between them to be controllably varied to effectively regulate the diameter of the pulley assembly in respect of a particular V-belt running over it. It is possible to effect such variation and regulation while the Reeves pulley is turning. Therefore, a regulator apparatus of the general kind already described may be used to open or close a Reeves pulley on the shaft of drive motor 90 and so, with this motor running at constant speed, vary the lineal speed of a V-belt running over this pulley and, as this belt transmits driving power either directly or indirectly to the slat conveyor belts, regulate the lineal speed of these belts.

Considering next the structure of the extrudate billet reforming and finishing section 26 which is shown in FIGS. 1 and 7, a four-sided slat conveyor apparatus having individual conveyor belts 92 (top), 94 (bottom), 96 and 98 (sides), is positioned in such alignment with the extruder and extrudate speed sensing apparatuses described already that billet 32 in its leftward movement will be directed to enter the enclosure defined by the identified belts. This enclosure has a cross section which is of essentially the same shape and size as that of the uniform axial passage through forming chamber 58. It is to be understood that the slat conveyor apparatus does not by itself constitute a part of this invention, but that its employment in ways hereinbefore and hereinafter shown is considered to be of an inventive nature.

Of the four slat conveyor belts the bottom slat conveyor belt 94 is the longest, extending beyond the other three at both ends. Consequently as the forward edge of billet 32 moves leftward off of roller support table 72, it runs onto belt 94 before entering the enclosure defined by all four belts. This gives the billet a bottom alignment with this enclosure. Side belts 96 and 98 provide a sidewise tapering entrance to this enclosure and align the billet laterally therewith, and of course the top belt 92 serves to prevent any riding up of the billet.

During its passage from the outlet of forming chamber 58 to the point of a completely defined enclosure in the slat conveyor apparatus, the billet may have experienced a slight amount of lateral blooming, and it may still be at a somewhat elevated temperature. Upon entrance into the slat conveyor enclosure, therefore, there is advantageously a slight compressive effect exerted on all four longitudinal surfaces of billet 32 to reform its cross section to the size and shape that it had upon initially leaving forming chamber 58. The length of time that it takes any given point on billet 32 to travel completely through the slat conveyor enclosure should be sufficient that the billet assumes substantially permanently stable dimensions. Such stabilization realized in the course of reforming may be aided at least to some extent by any cooling effect which the conveyor may exercise on the billet. Cooling may be realized, for example, by direct conduction through the individual slat panel elements bearing on the billet.

The method and means whereby motor 90 driving belts 92, 94, 96, and 98 is controlled to give these belts the same instantaneous lineal speed as that of the extrudate billet has been discussed already. The reasons for desiring such speed matching will now be considered. The slat conveyor belts being intended to reform the extrudate billet may, as before noted, exert compressive force on the longitudinal surfaces of this billet. However smooth the slat elements may be, and it is desired that they be smooth to the order of buffed and polished stainless steel, there will be some determinable coefficient of friction between the conveyor belts and the extrudate material. Consequently if the belts as they exert pressure on the billet also run faster than it, they will exert an accelerating drag and tend to stretch the billet. On the other hand, if they run slower than the billet, they will exert a decelerating drag and tend to compress the billet or buckle it.

Whatever effects such accelerating or decelerating drags have on actual billet density and transverse form, they will in either case cause marring of the longitudinal surfaces of the extruded and formed material. Since it is a purpose of the present invention to produce extrudate material blocks which are of attractive appearance, it is obviously desirable to prevent any such surface damage as that which may be caused in the fashion just described. For at least this reason the lineal speed of the slat conveyor belts is necessarily held as closely as practicable to that of the formed billet by means directly responsive to the billet speed, such as those means hereinbefore described.

Considering next the structure of the extrudate block cutoff section 28 which is shown in FIGS. 1, 8 and 9, a support platform structure 100 is located closely adjacent and in axial alignment with the outlet end of the enclosure defined by the four slat conveyor belts. Specifically, platform 100 is located very closely adjacent the "downstream" end of the bottom conveyor belt 94, which extends further in this direction than either belts 92, 96 or 98. Mounted upon platform 100 is a carriage 102 which, as it has bottom casters, is adapted to reciprocate or roll back and forth on platform 100, that is, toward and away from the downstream end of belt 94. The limits of this reciprocating movement are defined by a double crank and connecting rod mechanism, one mechanism on either side of the carriage.

Referring particularly to FIG. 8, which shows the carriage in solid outline in its initial position and in broken outline in its position with a product block 38 having just been cut off of billet 32, one of the aforementioned connecting rods is designated 104. The drive to its crank, which is itself turning about a centerline fixed with respect to the support platform 100, is transmitted through a belt or preferably a sprocket chain 106 running from the drive shaft of the bottom slat conveyor belt 94 to a pulley or sprocket in platform 100 to be shown. Since the speed of this conveyor belt is controlled by the speed of billet 32 as hereinbefore shown, it follows that the speed of rotation of the cranks is likewise a unique function of billet speed. Tension of chain 106 is adjusted by lever 107.

Referring now particularly to FIG. 9, the two crank elements of the above-mentioned crank and connecting rod mechanism are designated 108 and 110. They are driven by a common crank shaft 112. Sprocket wheel 114 on this shaft is the means of transmitting power thereto from chain 106. Other elements shown with the shaft are a gear 116 which is meshed with driving gear 117 of a rotary programmer to be mentioned presently, an electric brake 118, and an electric clutch 120. When the brake 118 is engaged, shaft 112 may not be turned. Sprocket wheel 114 is associated immediately with clutch 120. When this clutch is disengaged, sprocket 114 may be driven freely by chain 106, that is, without imparting any torque to shaft 112.

Supported on and extending above carriage 102 are cutter knife guiding stanchions 122 and 124 which are joined by crosshead yoke 126 at their upper ends and by anvil 127 at their lower ends. Running vertically on and guided by these stanchions is a cutter knife 128 intended for dividing the extrudate billet 32 into blocks. This knife is driven positively in both its up and down motions by a hydraulic piston arrangement. A piston rod 129 extends from the knife up into a cylinder 130 located on top of the crosshead yoke. Suitably designed pumps, valves, and flexible hoses associated with this hydraulically-operated knife system of kinds well known in the art are assumed, and are not specifically illustrated.

Other particular structural items of the extrudate block cutoff section 28 which may be noted, especially in FIG. 8, are the partially level, partially inclined upper roller surface of carriage 102, the framework 132 at the outer end of carriage 102, switch box 134 located on this framework having switch arm 136 depending therefrom with billet-engageable roller 137 at its lower end, and guide plates 138 for directing the advancing extrudate billet squarely into the path of the knife.

Mounted on the underside of platform support 100 and shown in FIG. 9 there is a conventional rotary programmer 139 having a driving gear 117 which is meshed with gear 116 on crankshaft 112 as before noted. The functions of this rotary programmer will be disclosed presently. Structurally, however, the programmer may conventionally comprise cams turned by rotation of shaft 112 through the geared connection indicated, and borne upon by cam followers on switch arms. As the cams which the programmer comprises are so turned, various switches may be tripped in a predetermined sequence and timing.

Considering next the function of the extrudate block cutoff section 28, suppose that conditions are as shown in FIG. 1, that is, with carriage 102 most closely adjacent slat conveyor belt 94, cutter knife 128 raised, and forward surface 34 of extrudate billet moving to the left and about to strike roller element 137 on switch arm 136. Suppose now that the billet does in fact strike this roller, the condition represented in solid outline in FIG. 8. The switch arm will swing outward and upward under this impact, continuing to so swing with continued leftward movement of the billet until roller 136 is running on the billet top surface 36. In the course of its swinging it will cause energization of a delay relay within switch box 134 which will act to close a switch in this same box.

The closing of this switch, which may be regarded as a starting switch for the cycle of operations of the extrudate block cutoff section 28, will not be instantaneous upon moving of switch arm 136. Instead there will be a finite delay period until relay action is complete, during which period the arm 136 must be held in the position it occupies with roller 137 running on top of the billet. Once relay action is complete, however, the starting switch will be held closed by appropriate electrical means such as a solenoid hold-in coil for the duration of the operating cycle of the extrudate block cutoff apparatus regardless of the position of switch arm 136. In other words, once the starting switch has been pulled in, switch arm 136 ceases to be a control element until this switch has been released or opened by other means to be described presently.

Upon the closing of the aforementioned starting switch, the electric brake 118 which has theretofore been engaged is released and immediately thereafter, essentially simultaneously therewith, the electric clutch 120 which has theretofore been released is engaged. With the engagement of the clutch, sprocket 114 which has been turning continuously may no longer free-wheel on shaft 112, but now must transmit torque to it. With the disengagement of the brake, additionally, crank shaft 112 is free to turn in its bearings in support platform 100, and does begin to turn. By the action of the cranks 108 and 110 and their connecting rods, outward (leftward) motion along platform 100 is imposed on carriage 102 and all the structure supported thereon.

Some time after the beginning of crankshaft motion, for example after the shaft has turned 80°, the carriage 102 with the cutter knife mechanism thereupon will have been accelerated until its outward velocity is substantially equal to that of the formed extrudate billet 32 which has, of course, been moving outwardly or leftwardly continuously. It is contemplated that the apparatus embodiment of the present invention will be so constructed and operated that substantial identity of leftward velocity of carriage 102 and billet 32 will exist for a crankshaft rotation period of from about 80° to about 120°, the carriage possibly overspeeding the billet briefly during this interval.

At about the time identity of carriage and billet velocity is initially achieved, say at 80° of crankshaft rotation, the rotary programmer 139 acts to throw a switch which energizes a solenoid valve in the high pressure hydraulic line leading to the upper side of the piston on rod 128 within cylinder 130 to open this valve. Substantially simultaneously the programmer also acts to cause withdrawal of a plug in the drain line for the region of cylinder 130 below the piston to allow high pressure oil in that region, which has theretofore been supporting cutter knife 128 in its raised position, to run away to a reservoir or sump. With high pressure on top of its piston and low pressure below it, cutter knife 128 is driven downwardly in a cutting stroke wherein it passes completely through billet 32 onto the anvil 127 to shear off a block 38 of extruded and formed material which may be, for example, 12 or 14 to 16 or 36 inches long. The actual length of block cut off is controllable to some extent by adjusting the position of switch box 134 on frame 132. The further to the left this box is located, the more of billet 32 will have to extend through guide stanchions 122 and 124 past the plane of the knife, and the longer the block 38 of material will be which is cut off the billet.

It is particularly desired to point out that in the operations just described, the carriage 102 and, necessarily, the knife and knife operating structure mounted thereon are brought up to an outward lineal speed to the left essentially equal to that of the extrudate billet 32 before the knife is started on its downward cutting stroke. Considering that a reasonable time for passage of knife 128 through the billet would be in the interval between 80° and 100° of crankshaft rotation, and considering further the substantial equivalence of carriage and billet lineal speed in the crankshaft interval of 80° to 120°, it follows that the knife element passed or in general may be made to pass completely through the billet when there is substantially no natural relative movement between them in the line of motion of the billet.

From this it follows further that a clean square cut off of the product block of extrudate material 38 from the billet may be, and in accordance with the practice of this invention is, made without ever interrupting or in any way interfering with the billet motion which, tracing back to the source of the billet, means that there need be no interruption or interference with the operations of feeding granular deformable material into hopper 46 and driving the extruder screw 44 for any reason associated with cutting off truly rectangular product blocks 38.

Just as the cutter knife arrives at the bottom of its stroke, it will trip a switch which will relieve hydraulic pressure on the upper surface of the driving piston in cylinder 130 by opening a bypass part for the upper region of this cylinder. According to the preferred mode of operation of the illustrated apparatus embodiment of this invention, the cutter knife 128 will be allowed to remain at the bottom of its stroke for about 2–3 seconds to insure the severing of any last lower membranes of extrudate material depressed under the knife edge. Following this dwell of the knife at the bottom of its stroke along guide stanchions 122 and 124, the rotary programmer 139 actuates a switch to energize a solenoid valve in a hydraulic line wherethrough fluid under high pressure is admitted to cylinder 130 in the region below the piston on rod 129.

The pressure on the upper surface of the piston having been relieved, the piston and cutter knife 128 will be driven upward in a full stroke which, in respect to knife action, may be considered a retracting stroke. An automatic check will close the fluid pressure line to the cylinder region below the piston with this piston and the knife all the way up to insure holding the knife in a raised position with the edge of its blade element above the top surface 36 of billet 32. According to the preferred mode of operation of the illustrated apparatus embodiment of this invention, cutter knife 128 will be fully retracted by about 120° of crank rotation. Thus, on the retracting stroke as well as on the cutting stroke there will be substantially no natural relative movement between the billet and the knife along the line of forwarding of the billet, and thus no particular pressure between them which might bend the knife blade or buckle the billet.

After the knife has been fully raised or retracted, the carriage 102 travels still further outwardly to the left for about 60° of additional crank rotation before reaching one limit of its reciprocating movement on support platform 100. During this last part of its outward travel, however, the carriage will slow down due to the configuration of the crank and connecting rod mechanism, and will be overspeeded by the steadily moving billet 32. The billet will act during this time to push the product block 38 along the inclined part of the upper roller surface of the carriage. The block of finished, and properly dimensioned product will slide down this inclined roller surface of the carriage and be conveyed by means known in the art to operating stations not shown and not constituting a part of the invention whereat it is wrapped, boxed, or otherwise processed.

The return travel of the carriage in the second part of its reciprocating motion to arrive at the position in which it is shown in FIG. 1 and in solid outline in FIG. 8 will be under normal influence of the crank and connecting rod mechanism as crankshaft 112 turns through another 180° to accomplish a full 360° of rotation. Very shortly before completion of this rotation, the rotary programmer will act to disengage the electric clutch 120, and it will finally engage the electric brake 118, having acted also to reset the electro-mechanical equipment in switch box 134 to restore effective starting control of the system to switch arm 136 and its roller 137 adapted to be engaged by the freshly cut end of billet 32 to start another cycle of the product block cut-off apparatus.

An exemplary apparatus embodiment of the invention and a preferred method of using the same having been described, it is manifest that this apparatus and method may be employed in the manufacture of highly finished, precisely shaped, void-free blocks of many different deformable plastic or rubbery materials which will now be described more fully.

A particularly outstanding polymer which is advantageously extruded in accordance with the present invention is butyl rubber, which is a copolymer of 0.5 to 15% of an isoolefin, e.g. isobutylene, 2-methyl-1 butene, and about 85 to 99.5% multiolefin of about 4 to 14, preferably about 4 to 6 carbon atoms, e.g. isoprene, butadiene, myrcene, etc., and having a Staudinger molecular weight of between about 20,000 and 300,000. Butyl rubber, described in Ind. & Eng. Chem. vol. 32, p. 1283 (1940), and also called GR–I rubber, may be made as described in the book: "Synthetic Rubber" by G. S. Whitby, and in U.S. Patent 2,356,128 to Thomas et al.

Halogenated butyl rubber may also be used. In producing halogenated butyl rubber, unmodified, unvulcanized butyl rubber is carefully halogenated so as to contain about at least 0.5 weight percent (preferably at least about 1.0 weight percent) combined halogen but not more than about "X" weight percent combined fluorine or chlorine or 3 "X" weight percent combined bromine or iodine wherein:

$$X = \frac{M_3 L}{(100-L)M_1 + L(M_2+M_3)} \times 100$$

and $L$ = mole percent of the multiolefin in the polymer
$M_1$ = molecular weight of the isoolefin
$M_2$ = molecular weight of the multiolefin
$M_3$ = atomic weight of halogen Restated, there should be at least about 0.5 weight percent of combined halogen in the polymer but not more than about one atom of fluorine or chlorine or three atoms of bromine or iodine combined in the polymer per molecule of multiolefin present therein; i.e., not more than about one atom of combined fluorine or chlorine or three atoms of combined bromine or iodine per double bond in the polymer.

Suitable halogenating agents which may be employed are gaseous chlorine, liquid bromine, iodine monochloride, hydrogen fluoride, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), N-bromosuccinimide, N-chloracetanilide, tri-bromophenol bromide, N-chloroacetamide, N,N'-dimethyl-5,5-dichloro or dibromo hydantoin, and other common halogenating agents.

The halogenation is generally conducted at about −50° C. to about +200° C., advantageously at about 10° to 65° C., preferably at about 20° to 50° C. (room temperature generally being satisfactory), depending upon the particular halogenation agent, for about one minute to several hours. The pressure is not critical and thus an advantageous pressure range is from about 0.5 to 400 p.s.i.a.; atmospheric pressure being satisfactory. The halogenation conditions are regulated to halogenate the rubbery copolymer to the extent above-mentioned.

Another polymer suitable for use in accordance with the present invention comprises polyisobutylene. Polyisobutylene having a molecular weight from 80,000 to 300,000 Staudinger or higher may be prepared by polymerizing isobutylene in the presence of a Friedel Crafts metal halide catalyst, e.g. $BF_3$, or $AlCl_3$, $TiCl_4$, etc., preferably dissolved in a non-freezing non-complex-forming solvent, such as methyl or ethyl chloride, at a temperature below 0° C., preferably below −40° C., or even as low as −100 to −150° C., if desired adding a small amount of a molecular weight poison, such as diisobutylene, n-butenes, and the like with the feed to give the molecular weight desired.

Other high molecular weight thermoplastic or thermo-softening solid polymers useful for the purposes of the present invention are polyethylene, polypropylene, or other olefin polymers, or also copolymers of ethylene with a small amount of propylene or higher olefin or diolefin, e.g. $C_4H_6$, isoprene, etc., or copolymers of propylene with a minor amount of another alpha olefin, or a diolefin, e.g. $C_4H_6$, isoprene, etc. For instance, these copolymers may contain about 93.0 to 99.5, preferably about 94 to 99 mol percent ethylene, and about 0.5 to 7.0, preferably about 1 to 6 mol percent propylene.

Polyethylene or ethylene copolymers may be made by high pressure polymerization, as in U.S. Patents 2,153,553 or 2,200,429, or by a low-pressure polymerization technique as described in German Patents 1,008,916 or 1,012,460 or Belgian Patents 504,160 or 538,782, or Italian Patent 526,101, by using a catalyst formed by mixing a metal compound having reducing properties, with a reducible metal compound in the presence of an inert liquid diluent. Such metal compound having reducing properties is generally an aluminum hydride or organo-aluminum compound such as aluminum dialkyls or diaryls or aluminum trialkyls or triaryls. Specific examples of such aluminum compounds include aluminum triethyl, aluminum trimethyl, aluminum triisopropyl, aluminum diethyl bromide, aluminum diethyl chloride, aluminum diphenyl bromide, aluminum diphenyl chloride, aluminum triphenyl, aluminum hydride, ethyl aluminum dihydride, diethyl aluminum hydride and ethoxy aluminum diethyl. In general, these aluminum compounds have the general formula

where R and R' are members selected from the group consisting of hydrogen, alkyl radicals and aryl radicals and X is a member selected from the group consisting of hydrogen, alkyl radicals, aryl radicals, halogen atoms, alkoxy radicals, aryloxy radicals, secondary amino radicals, secondary acid amide radicals, mercapto radicals, thiophenol radicals, radicals of carboxylic acids and radicals of sulfonic acids.

The reducible metal compound is one of a metal of groups IV–B, V–B, VI–B and VIII of the periodic system of elements. Examples of such elements include titanium, zirconium, hafnium, thorium, uranium, vanadium, columbium, tantalum, chromium, molybdenum and tungsten. Examples of the compounds of these metals which may be used include halides such as chlorides or bromides, oxy halides, such as oxychlorides, freshly precipitated oxides or hydroxides, organic compounds such as alcoholates, acetates, benzoates or acetyl acetonates. The preferred salts are those of titanium, zirconium, thorium uranium and chromium, Titanium salts are particularly preferred, such as titanium tetrachloride, $TiCl_3$, $TiCl_2$, titanium oxychloride or titanium acetyl acetonate.

For this low-pressure process, the temperature in the polymerization zone is maintained generally between about 0° to 90° C., preferably about 50° to 80° C. (e.g. 60° to 70° C.), and the polymerization will generally be carried out at a pressure of about 1 to 10 atmospheres or slightly higher.

Halogenated polymers of aliphatic olefins, e.g. ethylene, propylene, etc., containing 1–60% or so of halogen, e.g. preferably Cl, or also F or Br or even I, can be used directly, or partially dehalogenated to produce a vulcanizable product.

Other usable polymers comprise halogenated rubbery copolymers of ethylene, propylene, 1-butene or higher alpha olefins with 1–30% of diolefins, e.g. butadiene, isoprene, chloroprene, etc., which are vulcanizable both through unsaturation and halogen (1–30% Cl, F, etc.)

Natural rubber, e.g. hevea, pale crepe, or smoked sheet, etc. may be used.

Another polymer suitable for the purposes of the present invention is GR–S rubber, obtained by polymerizing 60–90% butadiene and 10–40% styrene in aqueous emulsion, as shown in U.S. Patent 1,935,733, with a peroxide or persulfate catalyst.

The above general process for producing GR–S rubber may likewise be generally employed for producing Buna-N-rubber, a copolymer of butadiene and acrylonitrile (as shown in U.S. Patent 1,973,000), and other rubbery polymers, obtained by the polymerization of isoprene, piperylene, dimethyl butadiene, 2-chlorobutadiene-1,3, singly or in combination, or by polymerizing in combination with mono-olefinic co-monomers, i.e., alpha methyl styrene, para methyl styrene, acrylonitrile, methacrylonitrile, chloroacrylonitrile, methyl acrylate, methyl methacrylate, methyl vinyl ketone, vinyl pyridine, etc., or mixtures thereof.

Mixtures of two or more of the various above-mentioned polymers may be used. For instance, 1 to 50% of polyisobutylene of 80,000 to 500,000 mol. wt. (Staudinger) with 50 to 99% of butyl rubber or of chlorine or bromine-containing butyl rubber; or mixtures of 1 to 50%, preferably about 5 to 30% of either butyl rubber or polyisobutylene with polymers of alpha olefins such as ethylene, propylene, 1-butene, etc., or copolymers of such alpha olefins containing 1 to 30% or so of a diolefin such as butadiene, isoprene, etc.; or mixtures of 1 to 50%, preferably about 5 to 20% of a high unsaturation rubber such as hevea, synthetic polyisoprene, GR–S, neoprene, etc., with a halogen-containing butyl rubber e.g. having 1 to 5% of chlorine or bromine.

In carrying out the present invention, it is preferred to use polymers either directly having a Mooney viscosity (8 minutes at 212° F.) in the range of about 5 to 100, and preferably about 30 to 90, or to modify the thermo softening polymers per se with plasticizers of softeners to reduce the Mooney viscosity, or with pigments or films which may in some cases increase the Mooney viscosity. Suitable plasticizers which may be used in the range of about 1 to 30 phr. (parts per 100 of rubber) include various resins such as steam cracked petroleum resins, terpine resins, hydrogenated abietate resins, styrene isobutylene resins (as made in U.S. Patent 2,274,749), etc. Various softeners which may be used in concentration of about 1 to 50, preferably 5 to 20 phr., include various non-volatile hydrocarbon oils, waxes, asphalts, etc. Pigments which may be used in amounts of 1 to 200, generally about 5 to 100, phr., include various carbon blacks, e.g. channel black, furnace black, thermal black, etc., as well as mineral fillers, e.g. clay, silica, titanium oxide, or various blue, red and other colored pigments. Thus, the invention is particularly well adapted for preparation of so called master batches of rubbery polymers with carbon black or mineral fillers, or oil extended rubbery or thermo softening polymers. Such master batches generally are somewhat tacky and sufficiently plastic that they are difficult to handle and package with prior art methods, but may be very satisfactorily handled by means of the process and apparatus used in the present invention.

Resort may be had to modifications and variations of the disclosed embodiments without departing from the spirit of the invention or the scope of the appended claims.

What is claimed is:

1. In an apparatus for handling deformable materials, the combination which comprises an extruder tube having an essentially circular cross section, a discharge end, and a die plate closure therefor defining a plurality of passageways therethrough, means to compress and force said deformable material through said die plate passageways, an expansion chamber portion having an inlet end adapted for attachment to said extruder tube at said die plate to accommodate extrudate from said plate, said expansion chamber having interior wall portions flared outwardly to an outlet end of rectangular cross section and larger cross sectional area than said inlet end and said wall portions having roughened and imperforate surfaces offering substantial resistance to flow of said material thereon, and a forming chamber having roughened interior surfaces which are lubricated offering reduced resistance to flow of said material thereon, said forming chamber being of substantially uniform rectangular cross section and disposed in communicating connection with said outlet end of said expansion chamber.

2. An apparatus according to claim 1 in which means are associated with the substantially uniform cross section forming chamber for providing lubrication at a plurality of points of said roughened interior surface.

3. An apparatus for extruding, forming, and finishing deformable materials for packaging which comprises an extruder tube having a die plate closure containing an orifice portion at one end thereof, means to compress and force said material through said die plate orifice portion, a lubricant-free, roughened, and tapered expansion chamber portion having an inlet end dimensioned for attachment to said extruder tube at said die plate and extending therefrom to an outlet end of rectangular cross section and of an area larger than said inlet end, a forming chamber having roughened and lubricated interior wall surfaces and a rectangular and substantially uniform cross section in communicating connection with the outlet end of said expansion chamber, means for introducing a fluid lubricant material onto said forming chamber interior wall surfaces at a plurality of points, conveyor means defining an enclosure having a cross section essentially equal to that of said material upon discharge thereof from said forming chamber, means for driving said conveyor means substantially at the speed of extrusion of said material, and means following said conveyor means for dividing said material carried by said conveyor means into blocks of packageable form.

4. A material handling apparatus including the combination which comprises means for forming and forwarding at a variable rate a plastic mass of deformable material as a continuous billet, speed sensing means actuated by the movement of said billet, movable confining elements surrounding said moving billet and adapted to travel therewith to hold it in a desired shape and cross sectional configuration, and drive means for said confining elements so controlled by said speed sensing means that said elements move substantially at the same instantaneous rate as said billet regardless of variations in the rate of forwarding thereof.

5. An apparatus according to claim 4 including billet dividing means for cutting off sections of said billet, said dividing means being located beyond said movable confining elements distantly from said speed sensing means and comprising a blade element adapted to travel in the direction of motion of said billet at a speed substantially equal to the instantaneous rate of forwarding of said billet during the time said blade element is passing through said billet on a cutting stroke, and said dividing means being under control of said speed sensing means.

6. A process for handling deformable materials, said process comprising the steps of (1) compressing said material into a plurality of individual strands; (2) introducing said strands into an interiorly lubricant-free and tapered expansion zone to relieve built-up stresses in said strands, said expansion zone being sufficiently roughened interiorly to provide a drag on said strands after their introduction thereinto and allow them to recombine upon expansion therein as a body of coherent material; (3) forwarding said body of coherent material into and through an interiorly lubricated forming zone of rectangular cross section; (4) forwarding said body of coherent material into and through a reforming and finishing zone of rectangular cross section shape and size substantially the same as those of said body of coherent material as formed and essentially completely defined by a plurality of conveyor surfaces; (5) moving said conveyor surfaces immediately adjacent said body of coherent material in the same direction and at substantially the same rate as said body of coherent material, and (6) dividing said body of coherent material as reformed and finished into a plurality of substantially uniform blocks.

7. In an apparatus for handling deformable materials which have been extruded as a continuously moving billet, the combination which comprises (1) a conveyor means including a plurality of conveyor belts essentially completely defining an enclosure having a cross sectional area transverse to the direction of motion of said continuously moving billet essentially equal to that of said billet, (2) means for driving each of said conveyor belts at substantially the same rate as said billet is moving, said means comprising a motor drive means for said conveyor belts, a frame disposed before said conveyor means, at least one wheel having a shaft mounted in said frame, said wheel adapted to engage a surface of said moving billet and be driven thereby, a signal generating means mounted on said frame and driven by said shaft, and controller means adapted to regulate said motor drive means, said controller means being actuated by signals received from said signal generating means, and (3) means for dividing said moving billet into blocks of packageable form without impeding the movement of said billet, said last-named means being located beyond said conveyor means distantly from said frame disposed before said conveyor means.

References Cited in the file of this patent

UNITED STATES PATENTS

| | | |
|---|---|---|
| 1,540,650 | Prather | June 2, 1925 |
| 2,039,191 | Schidrowitz et al. | Apr. 28, 1936 |
| 2,332,829 | Parsons | Oct. 26, 1943 |
| 2,519,375 | Jargstorff | Aug. 22, 1950 |
| 2,537,977 | Dulmage | Jan. 16, 1951 |
| 2,540,146 | Stober | Feb. 6, 1951 |
| 2,613,618 | Sharp | Oct. 14, 1952 |
| 2,641,042 | Kopp | June 9, 1953 |
| 2,649,618 | Rhodes et al. | Aug. 25, 1953 |
| 2,817,875 | Harris et al. | Dec. 31, 1957 |
| 2,866,730 | Potchen et al. | Dec. 30, 1958 |
| 2,905,972 | Aykanian et al. | Sept. 29, 1959 |
| 2,916,792 | Crook et al. | Dec. 15, 1959 |